United States Patent Office 2,836,635
Patented May 27, 1958

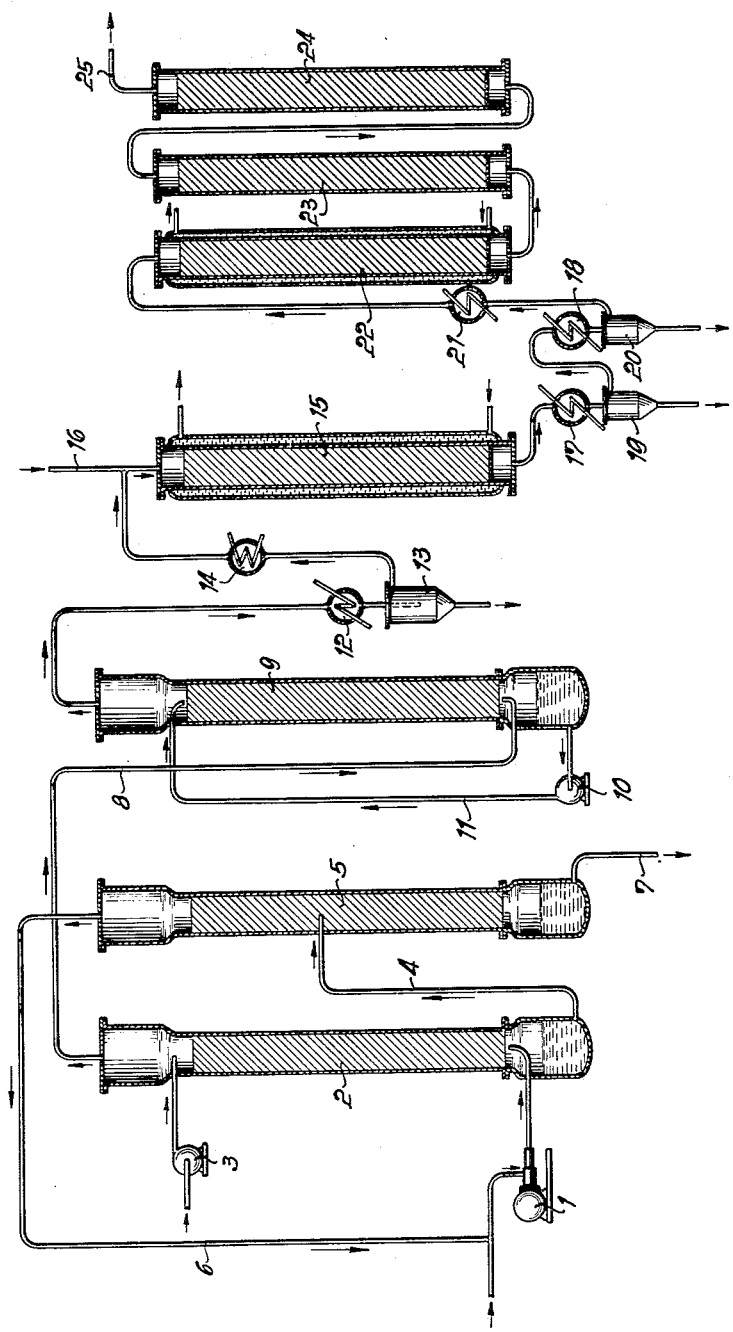

2,836,635
PROCESS FOR THE TREATMENT OF GASES CONTAINING ETHYLENE

Herbert Göthel, Oberhausen-Sterkrade, Helmut Kolling, Duisburg-Hamborn, and Otto Roelen and Nikolaus Geiser, Oberhausen-Holten, Germany, assignors to Ruhrchemie Aktiengesellschaft, Oberhausen-Holten, Germany Application June 1, 1955, Serial No. 512,432
Claims priority, application Germany June 16, 1954
6 Claims. (Cl. 260—677)

The present invention relates to a process for the treatment of gases containing ethylene.

With suitable active materials or polymerization stimulants it is easy to convert ethylene at pressures below 200 kg./sq. cm. and at temperatures up to about 100° C. into high molecular products, the molecular weights of which exceed 100,000 and reach, for example, 800,000. Examples of suitable polymerization stimulants are mixtures of diethyl aluminum chloride and titanium tetrachloride, or other organo-metallic compounds, and other mixtures of active materials. However, only ethylene which is of extreme purity can be polymerized in this manner. The ethylene fractions separated from coke oven gas or cracked hydrocarbon gases, must therefore be particularly carefully freed from all impurities, especially from other hydrocarbons and oxygen-containing compounds. Even very small amounts of carbon dioxide, carbon monoxide, water vapor, oxygen, and acetylene render an extensive polymerization of ethylene at pressures below 200 kilograms/square centimeter practically impossible.

From the undesirable substances, oxygen and carbon monoxide can be removed by liquefaction of the gas and fractionation. Ethylene thus purified will, however, always contain residues of acetylene and carbon dioxide. The content of these impurities is preferably determined by means of phenyl isopropyl potassium (see O. Runge "Organo-Metall-Verbindungen," 1944, page 66). Oxygen-containing gas constituents and acetylene decolorize phenyl isopropyl potassium. The particular degree of purity of the ethylene is most conveniently calculated by residual oxygen content. If ethylene is to be processed successfully at low pressures by means of active materials and polymerization stimulants to produce high molecular compounds, then the residual content of oxygen should not be allowed to exceed a maximum of 0.01% by volume and preferably a maximum of 0.005% by volume.

It has now been found that an extremely extensive purification of ethylene which surprisingly meets with the purity requirements necessary in the low-pressure polymerization, can be obtained in a technically unobjectionable and economically advantageous manner by successively effecting a washing operation with water under pressure, a washing with alkali solutions, a selective hydrogenation using catalysts containing metals of the 8th group of the periodic system, and a final drying. This treatment may immediately be followed by the ethylene polymerization. The individual operational steps of the combination in accordance with the invention may be carried out under equal pressure or under different pressures. It is also possible to operate with intermediate pressure relief and increase. The combination, according to the invention, of washing with water and with alkaline solutions, hydrogenation, and drying has, in this order fundamental advantages which cannot be obtained with a different combination, or with only single steps alone.

The unpurified ethylene is first washed with water in countercurrent using preferably a slight superatmospheric pressure of, for example 10 to 20 kg./sq. cm. The treatment with water under pressure removes acetylene and carbon dioxide from the ethylene to less than 0.1% by volume. At the same time a part of the ethylene is also dissolved. When releasing the pressure, the ethylene dissolved is largely set free, while only very small amounts of acetylene and carbon dioxide escape. The gas escaping when the pressure is released from the washing water can, therefore, be admixed to the incoming crude ethylene. The undesirable carbon dioxide and acetylene are removed with the effluent scrubbing water. The ethylene losses occurring in the water washing are only low and generally amount to about 1% $C_2H_4$.

The treatment with caustic liquors is expediently effected under the pressure used in the pressure water washing. The removal of the residual carbon dioxide amounting to less than 0.1% $CO_2$ requires only little alkali solution. Traces of water entrained from the caustic washing can easily be removed by a subsequent cooling with water. A treatment with calcium chloride may also be used for this purpose.

The selective hydrogenation effected after the caustic washing is carried out in a temperature range of 80–200° C. and at pressures of 1–50 kg./sq. cm., preferably 1–20 kg./sq. cm. Catalysts containing metals of the 8th group of the periodic system may be used for the hydrogenation. Most desirable are nickel-containing catalysts the hydrogenating activity of which is reduced by the mode of preparation and/or composition. The use of, for example, a nickel catalyst consisting of 100 parts of kieselguhr, 10 parts of nickel, and 4 parts by weight of aluminum hydroxide has proved to be particularly advantageous. The hydrogenation is best effected with fixed-bed catalysts. However, the catalyst may also be used in other arrangements, such as in the suspended state.

The partial hydrogenation removes the residual content of acetylene present in the gas. If the hydrogen required for this purpose is not yet contained in the gas, it is added thereto prior to the introduction into the hydrogenation unit in amounts corresponding to the stoichiometrical requirement or in a quantity only slightly in excess thereof in order to cause no undesirable hydrogenation of ethylene in addition to the hydrogenation of acetylene. Due to the low content of acetylene and the preceding water washing, the quantity of hydrogen required for the hydrogenation is so small that a hydrogenation of the ethylene to form ethane, as it readily occurs if larger amounts of acetylene are to be hydrogenated, need not be feared. The preceding water washing which largely reduces the content of acetylene, increases the life of the catalyst used for the hydrogenation. When all of the actylene contained in the unpurified ethylene is hydrogenated, greater difficulties will result since acetylene is likely to form polymerisates which deactivate the surface of the hydrogenation catalyst.

The hydrogenation which, according to the invention, follows the washing operations with water under pressure and with alkali solutions, has the further advantage that also the very low oxygen content of the gas and the quantities of oxygen entrained from the preceding washing operations, especially from the washing with water under pressure, are removed. Moreover, by this hydrogenation a final purification from any other present impurities is reached which, as the case may be, are contained in amounts which cannot be proved by analysis at all or only with great difficulties.

After the hydrogenation, the gas must be carefully dried. This may be effected by known processes and with the use of known equipment. It has been found particularly advantageous to cool the gas to 0° C. or lower temperatures, followed by a treatment with active silicic acid which is likewise effected at a temperature of below 0° C., whereafter the gas is dried with calcium chloride, and finally with potassium hydroxide which is deposited on pumice or other porous materials. Prior to passing the gas through these drying stages, the gas pressure may be increased.

Between the individual operational steps the gases may be released from pressure and a heat equalization between the individual media may be effected.

By means of the gas treatments combined in accordance with the invention, it is possible to obtain ethylene gases which, with phenyl isopropyl potassium, show residual values of less than 0.005% by volume of oxygen and which are excellently suited for the low pressure polymerization of ethylene.

The invention will now be more fully described in an example with reference to the accompanying drawing, which illustrates an embodiment of the apparatus for carrying out the process according to the invention in diagrammatic form. It should, however, be understood that the drawing and the description thereof are only given by way of illustration and not of limitation and that many changes can be made in the details without departing from the spirit of the invention.

*Example*

The ethylene to be purified had the following composition:

| | Percent by volume |
|---|---|
| $C_2H_4$ | 92.6 |
| $C_2H_6$ | 3.0 |
| $C_2H_2$ | 2.25 |
| $CO_2$ | 2.0 |
| $H_2O$ | 0.1 |
| $O_2$ | 0.05 |

20 cubic meters of this gas were hourly compressed to 18 kg./sq. cm. by means of a compressor 1 and introduced at the bottom of a tower 2 having a diameter of 200 mm. and a height of 8 meters, and being filled with Raschig rings of 10 mm. in diameter. At the top of the tower 2, 1900 liters/hr. of water having a temperature of about 10° C. were introduced under a pressure of 18 kg./sq. cm. by means of a pump 3. The aqueous solution of the absorbed gases which forms in tower 2, was passed through line 4 to a tower 5 of a diameter of 250 mm. and a height of 4 m., which was filled with Raschig rings of 10 mm. in diameter. Here, the solution was released to atmospheric pressure. The major part of the gas escaping due to the pressure release, consisted mainly of ethylene and was returned through a line 6 to pump 1 while the water running off through a line 7 from the bottom of the tower was drained from the system. This water contained the major part of the eliminated carbon dioxide and acetylene, and only about 150 cc. of ethylene per liter.

The ethylene escaping from the top of the tower 2 and washed with water under pressure, contained less than 0.1% by volume of carbon dioxide and acetylene. It was passed without pressure relief through line 8 and introduced at the bottom of a tower 9 which had a diameter of 100 mm. and a height of 4 m. and was filled with Raschig rings of 10 mm. diameter. At the top of this tower, a sodium hydroxide solution (15% NaOH) was introduced at a rate of 200 liters/hr. and recirculated by means of a pump 10 and a line 11. The sodium hydroxide solution used for washing was replenished in batches or continuously as required according to the amount of carbon dioxide absorbed. The gas escaping at the top of tower 9 contained less than 0.005% by volume of $CO_2$. In a cooled heat exchanger 12 the gas was freed from residues of sodium hydroxide solution entrained which were removed at the bottom of a separator 13. The gas was then heated to about 100° C. in a preheater 14. After the preheater 14 the gas was passed in downward direction through a vertical tube 15 provided with a heating jacket and having a diameter of 150 mm. and a height of 4 m. It was filled with a catalyst consisting of 100 parts by weight of kieselguhr, 10 parts by weight of nickel, and 4 parts by weight of alumina. By means of this catalyst and of 100 normal liters/hr. of hydrogen admitted through a line 16, the undesirable constituents of the gas were hydrogenated.

The gas leaving the hydrogenation unit 15 was cooled in cooler 17 with water and in a subsequent cooler 18 with cold salt solution to a temperature of about 0° C. The quantities of water thereby separated were removed by means of the collecting vessels 19 and 20.

Thereafter, the gas was passed through a low-temperature cooler 21 where the gas temperature was decreased to −10° C. Thereby, the last traces of moisture were removed. Following this the gas was passed through a tower 22 filled with active silicic acid and maintained at a temperature as low as possible, by means of a cooling jacket. The tower 22 was followed by two towers 23 and 24 which contained calcined granular calcium chloride and granular pumice, respectively, the latter having previously been soaked with caustic potash solution. The towers 22 to 24 had a diameter of 150 mm. and a height of 6 m. After having left the tower 24, the gas flowing off through a line 25 had a residual oxygen content of only 0.003% by volume as determined by means of phenyl isopropyl potassium.

Two cubic meters of a hydrogenated and dried hydrocarbon fraction $C_9$–$C_{11}$ distilled over sodium were charged to a reactor having a capacity of 3 cubic meters. The catalyst used consisted of a mixture of 2 kg. of diethyl aluminum monochloride, 0.3 kg. of titanium tetrachloride, and 10 kg. of the $C_9$–$C_{11}$ hydrocarbon fraction. Thereafter, the purified ethylene-containing gas, which had previously been released to a pressure of 2 kg./sq. cm. was introduced while thoroughly stirring and while gradually increasing the temperature from 20° C. to 60°. The polymerization started immediately. About 99% of the ethylene was polymerized, while 1% of the ethylene together with the ethane present in the gas left the reactor as tail gas.

What we claim is:

1. A process for the purification of an ethylene-containing gas which comprises subjecting said gas to the following sequence of steps: washing the gas with water under pressure; thereafter washing the gas with alkali solution, then selectively hydrogenating the gas in the presence of a catalyst containing metals of the 8th group of the periodic table to remove acetylene from the gas; and lastly drying the gas, said sequence also including: depressurizing the used wash water and adding the dissolved gases released thereby to gas entering said purification sequence.

2. A process according to claim 1, in which said hydrogenation is effected at gas pressures of up to 50 kg./sq. cm. and temperatures of 80–200° C. with the use of nickel catalysts of reduced hydrogenating activity.

3. Process according to claim 1 in which all of said operational steps are effected at a constant gas pressure of up to 50 kg./sq. cm.

4. A process according to claim 1 in which, prior to said drying step an increase in pressure is effected.

5. The process according to claim 4, wherein the drying is carried out with active silicic acid and calcined calcium chloride.

6. A process according to claim 1 in which a pressure release and a heat equalization are effected between the individual steps.

References Cited in the file of this patent

UNITED STATES PATENTS

| 2,379,670 | Welling | July 13, 1945 |
| 2,432,423 | Hunter | Dec. 9, 1947 |

FOREIGN PATENTS

| 533,362 | Belgium | May 16, 1955 |